US011146463B2

(12) United States Patent
Tedaldi et al.

(10) Patent No.: US 11,146,463 B2
(45) Date of Patent: Oct. 12, 2021

(54) PREDICTING NETWORK STATES FOR ANSWERING WHAT-IF SCENARIO OUTCOMES

(71) Applicant: Cisco Technology, inc., San Jose, CA (US)

(72) Inventors: David Tedaldi, Zurich (CH); Grégory Mermoud, Veyras (CH); Vinay Kumar Kolar, San Jose, CA (US); Jean-Philippe Vasseur, Saint Martin D'uriage (FR); Pierre-Andre Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/431,782

(22) Filed: Jun. 5, 2019

(65) Prior Publication Data

US 2020/0389371 A1 Dec. 10, 2020

(51) Int. Cl.
*H04L 12/24* (2006.01)
*H04L 12/46* (2006.01)
*G06N 20/00* (2019.01)
*H04L 12/715* (2013.01)
*G06N 3/04* (2006.01)
*G06N 3/08* (2006.01)

(52) U.S. Cl.
CPC ....... *H04L 41/5009* (2013.01); *G06N 3/0454* (2013.01); *G06N 3/088* (2013.01); *G06N 20/00* (2019.01); *H04L 12/4633* (2013.01); *H04L 12/4641* (2013.01); *H04L 41/16* (2013.01); *H04L 45/64* (2013.01)

(58) Field of Classification Search
CPC ............. H04L 41/5009; H04L 12/4633; H04L 12/4641; H04L 41/16; H04L 45/64; G06N 20/00; G06N 3/0454; G06N 3/088
See application file for complete search history.

(56) References Cited

U.S. PATENT DOCUMENTS

| 9,230,211 | B1* | 1/2016 | Basu .................... G06Q 10/063 |
| 9,451,473 | B2 | 9/2016 | Ouyang et al. |
| 10,075,390 | B2* | 9/2018 | Karthikeyan ........... H04L 47/70 |
| 10,142,164 | B2 | 11/2018 | Ramachandran et al. |
| 10,616,257 | B1* | 4/2020 | Soulhi ..................... H04L 43/16 |

(Continued)

OTHER PUBLICATIONS

U.S. Appl. No. 16/425,093, Unpublished May 29, 2019, Vasseur et al.

*Primary Examiner* — Shean Tokuta
*Assistant Examiner* — Juan C Turriate Gastulo
(74) *Attorney, Agent, or Firm* — Behmke Innovation Group LLC; Kenneth J. Heywood; James J. Wong (57) ABSTRACT

In one embodiment, a device constructs a set of controlled what-if input parameters for evaluating a what-if scenario in a network. The device uses the set of controlled what-if input parameters and state data indicative of a current state of the network as input to a network state model. The network state model predicts values for the state data conditioned on the what-if input parameters. The device predicts a key performance indicator (KPI) in the network by using the predicted values for the state data from the network state model as input to a machine learning-based KPI prediction model. The device initiates a routing change in the network based in part on the predicted KPI.

18 Claims, 6 Drawing Sheets

(56) References Cited

U.S. PATENT DOCUMENTS

| | | | |
|---|---|---|---|
| 2015/0281004 A1* | 10/2015 | Kakadia | H04L 41/0816 370/235 |
| 2015/0289146 A1* | 10/2015 | Ouyang | H04L 47/127 370/252 |
| 2015/0309840 A1* | 10/2015 | Ding | H04L 67/303 718/104 |
| 2017/0111233 A1* | 4/2017 | Kokkula | H04L 41/0823 |
| 2019/0036779 A1 | 1/2019 | Bajaj | |
| 2019/0036816 A1 | 1/2019 | Evans et al. | |
| 2019/0149425 A1* | 5/2019 | Larish | G06N 3/0454 706/16 |

* cited by examiner

PREDICTING NETWORK STATES FOR ANSWERING WHAT-IF SCENARIO OUTCOMES

TECHNICAL FIELD

The present disclosure relates generally to computer networks, and, more particularly, to predicting network states for answering what-if scenario outcomes.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network is layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. To do so, the routing mechanism may need to address various what-if scenarios. Underlying these scenarios is the question "what would happen to X, if Y occurs?" For example, before rerouting traffic onto a backup tunnel, the router may need to assess whether the backup tunnel would be able to meet the service level agreement (SLA) of the rerouted traffic, while also accounting for the extra overhead that the rerouted traffic would have on that tunnel. However, training a model to address what-if scenarios in the context of SD-WANs is quite difficult, as the complexity and system dynamics of SD-WANs make simulations all but impossible to implement.

DESCRIPTION OF EXAMPLE EMBODIMENTS

Overview

According to one or more embodiments of the disclosure, a device constructs a set of controlled what-if input parameters for evaluating a what-if scenario in a network. The device uses the set of controlled what-if input parameters and state data indicative of a current state of the network as input to a network state model. The network state model predicts values for the state data conditioned on the what-if input parameters. The device predicts a key performance indicator (KPI) in the network by using the predicted values for the state data from the network state model as input to a machine learning-based KPI prediction model. The device initiates a routing change in the network based in part on the predicted KPI.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
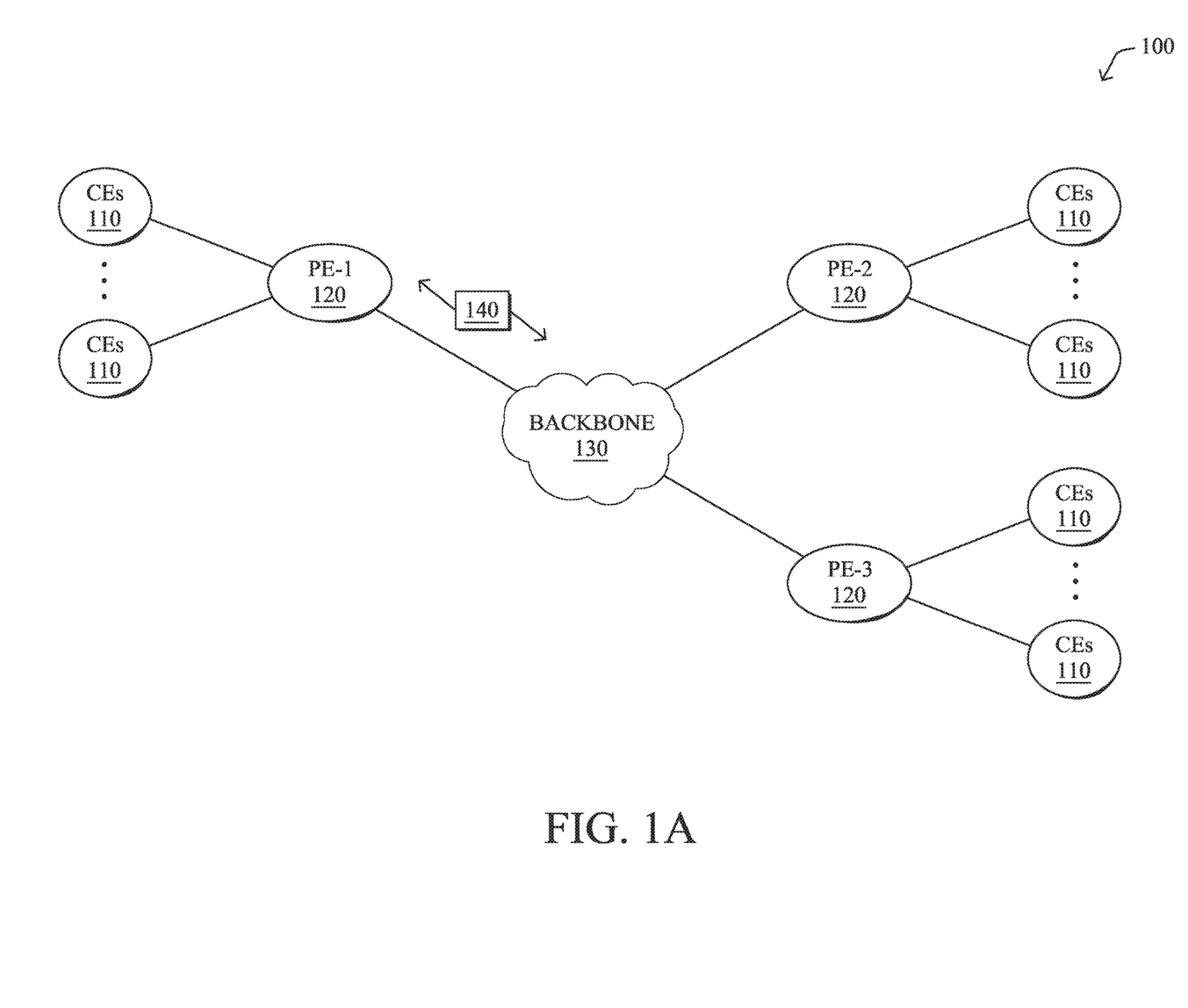
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
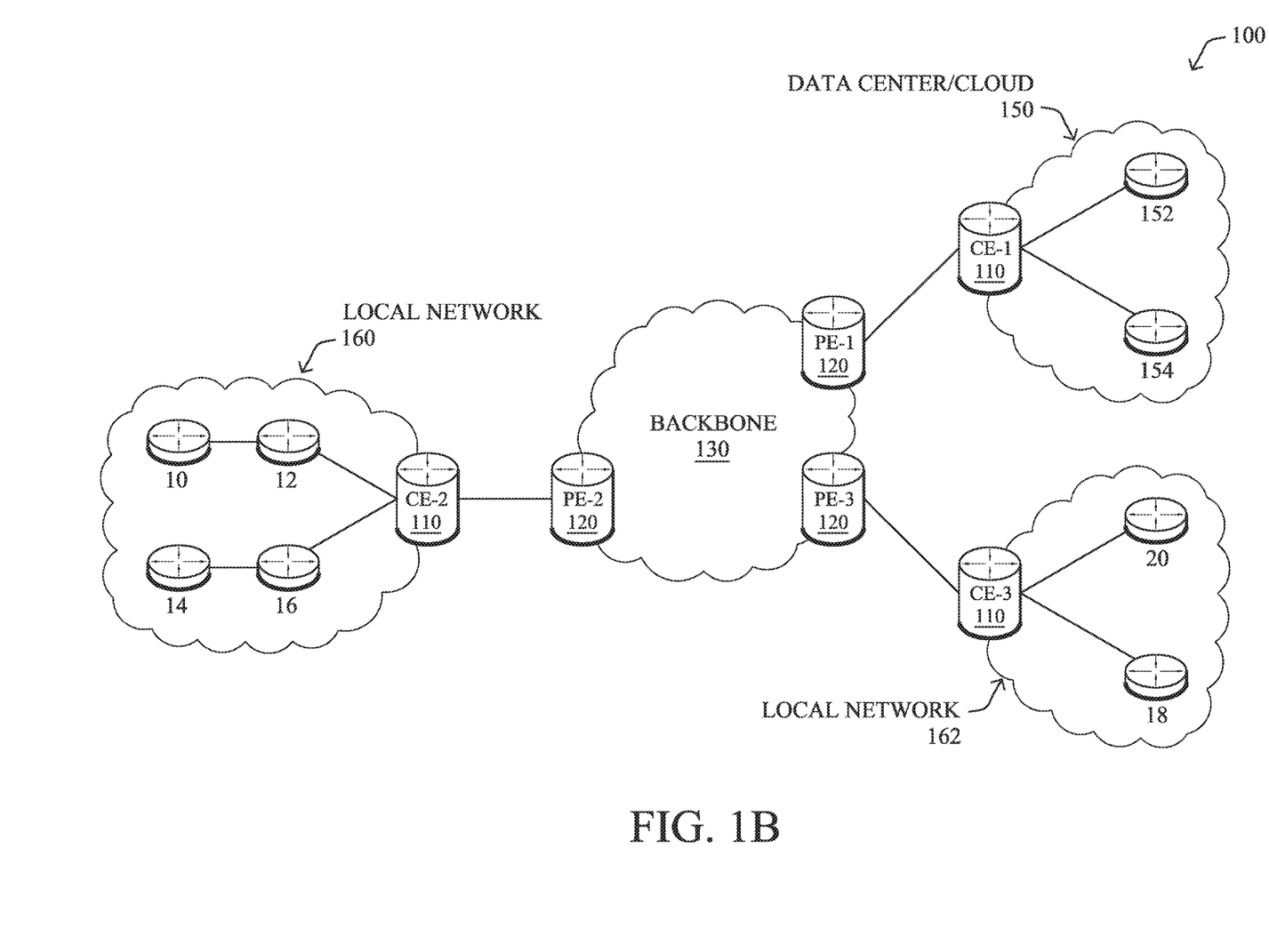

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
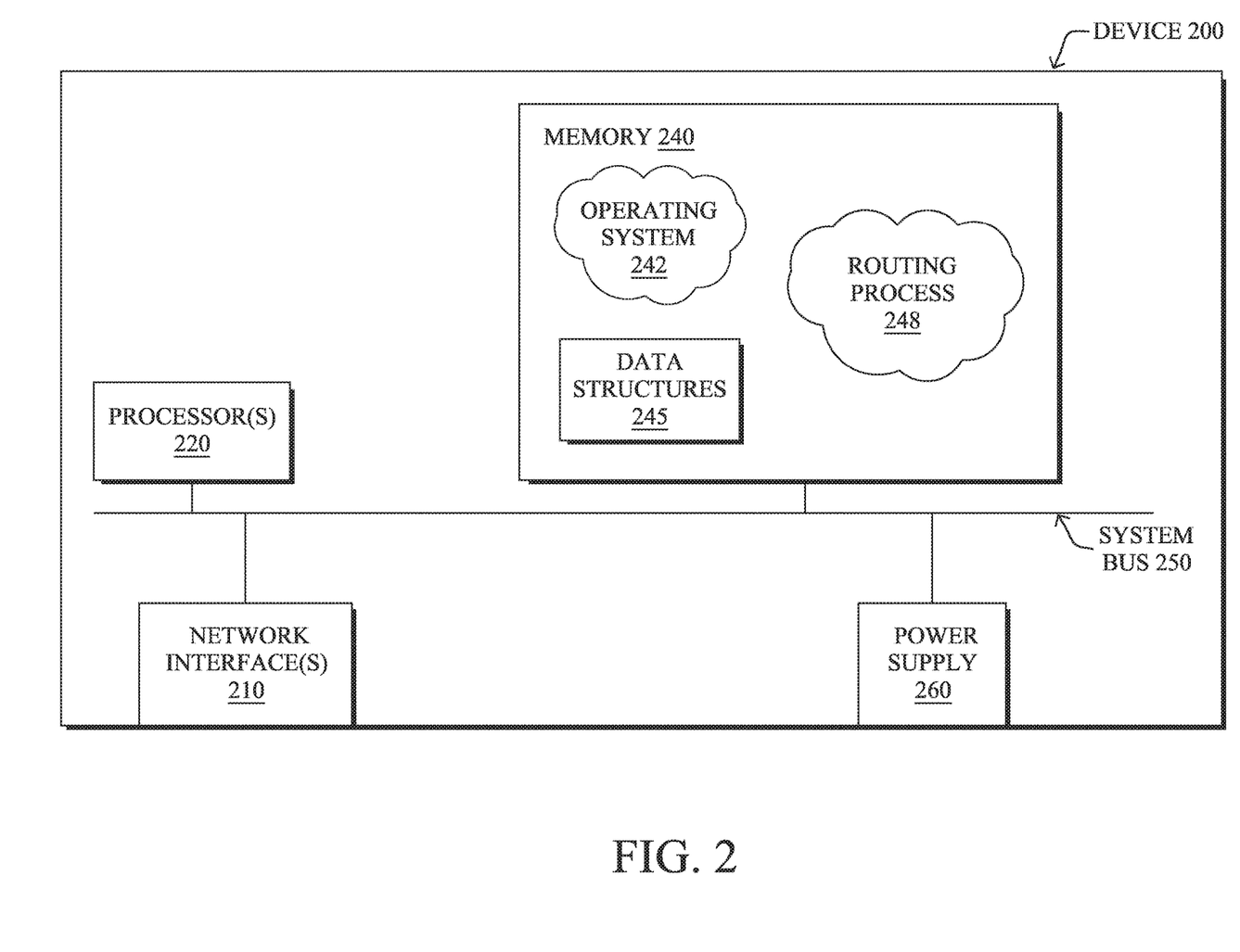
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which is quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

As noted above, predictive routing in SD-WANs represents an evolution over traditional reactive routing, allowing the network to address problems before they actually occur. To do so, the predictive routing mechanism will need to answer questions of the type "what would happen to X if Y happened?" For instance, in predictive routing, the routing mechanism needs to not only anticipate that a primary link may go down, but also ensure that the path used as a backup will meet the service level agreement (SLA) needs of the traffic, with the extra overhead of the redirected traffic on the tunnel. Another example relates to adding more traffic (or more users) to predict the joining times in a Wi-Fi network. The general framework that answers this question is called a "what-if scenario." In this specific case, the question can be formulated as "what would happen to the SLA if the traffic were redirected from tunnel A to tunnel B?"

One important challenge that may arise in many what-if scenarios relates to the underdetermination of the feature vector used as input to the model. For example, consider the case of predicting the effect of doubling the client count on the onboarding time of the network. To do so, one may model the state of the network at time t using a N-dimensional feature vector $X=[X_1, X_2, \ldots X_N]$, where $X_1$ denotes the client count, while other features model other network metrics (which may be related to wired network characteristics, wireless network characteristics, traffic generated by the clients, state of the network elements, etc.). Now, assuming that there is a predictive model $M(X)=Y$ where Y is the onboarding time, it may seem that predicting the impact of doubling the client count is as simple as constructing a feature vector X wherein feature $X_1=2*X_i$ and perform an inference step of $Y=M(X)$ to obtain the onboarding time Y.

However, the above naïve approach will generally fail, in practice. Indeed, on top of learning the model M, one needs to generate a valid feature vector X under the constraint that $X_i=2*X_i$. Indeed, features are often interdependent, and one cannot simply modify a subset of them without finding appropriate values for the others. In this specific example, interference levels, CPU and memory usages of the APs, and other quantities are highly dependent on the client count. Changing the client count by a significant fraction without adjusting the corresponding variables would lead to degenerate, infeasible feature vectors X, in turn causing the model to make incorrect predictions.

Predicting Network States for Answering What-if Scenario Outcomes

The techniques herein propose a system to predict the network state feature vector for a given what-if question, thereby enabling what-if modeling. This network state can later be used by different predictive models that predict network key performance indicators (KPIs), to predict whether the SLAs of the traffic will be satisfied. In contrast to using a single predictive model, the techniques herein propose breaking down the what-if prediction into two phases: 1.) predicting the network state and then 2.) predicting the KPI.

Specifically, according to one or more embodiments herein, a device constructs a set of controlled what-if input parameters for evaluating a what-if scenario in a network. The device uses the set of controlled what-if input parameters and state data indicative of a current state of the network as input to a network state model. The network state model predicts values for the state data conditioned on the what-if input parameters. The device predicts a key performance indicator (KPI) in the network by using the predicted values for the state data from the network state model as input to a machine learning-based KPI prediction model. The device initiates a routing change in the network based in part on the predicted KPI.

Illustratively, the techniques described herein may be performed by hardware, software, and/or firmware, such as in accordance with the routing process 248, which may include computer executable instructions executed by the processor 220 (or independent processor of interfaces 210) to perform functions relating to the techniques described herein.

Figure 3:
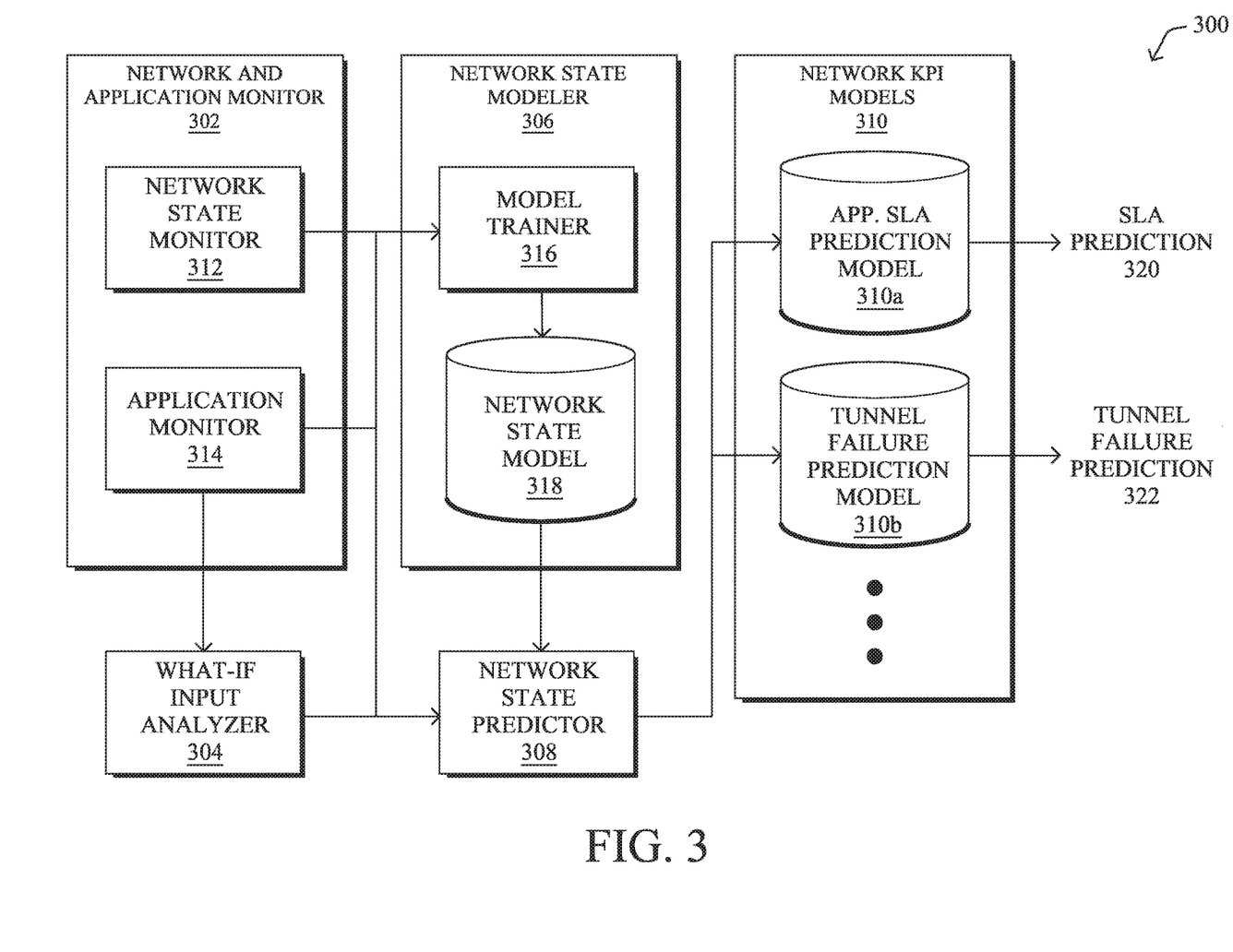
FIG. 3 illustrates an example architecture for what-if modeling in a network.

Operationally, FIG. 3 illustrates an example architecture 300 for what-if modeling in a network, according to various embodiments. As shown, architecture 300 may include any or all of the following components: a network and application monitor 302, a what-if input analyzer 304, a network state modeler 306, a network state predictor 308, and/or any number of network KPI models 310. As would be appreciated, the various components shown may be combined or omitted, as desired. Further, these components can be executed either locally on a particular device (e.g., device 200) or implemented in a distributed manner, in various cases.

As noted above, what-if scenario evaluation is a key function for both next generation network assurance services and for predictive routing mechanisms. Indeed, a network assurance service that is able to evaluate what-if scenarios will help a network administrator make more informed decisions, prior to changing the operations of the network. Similarly, when a path or tunnel is predicted to fail, great care must be taken to ensure that rerouting the affected traffic onto another path or tunnel will still satisfy the SLA(s) of the traffic and not impinge on the existing traffic on that path or tunnel.

In various embodiments, architecture 300 may include network and application monitor 302 which may comprise two sub-components: a network state monitor 312 and an application monitor 314. In general, network state monitor measures the different network features indicative of the current state of the network. For example, network state monitor 312 may obtain telemetry data from the network from any number of telemetry exporters regarding the traffic characteristics of the network such as the path or tunnel assignments of the traffic flows, timing information, packet loss, latency, jitter, connection failures, resource usage (e.g., CPU, memory, etc.), or any other telemetry data that can be captured that is representative of the state of the network.

Application monitor 314 may similarly obtain application-specific telemetry for the network traffic. For example, application monitor 314 may obtain telemetry regarding the connection status of any number of applications in the network (e.g., a voice application, Office365, etc.) such as when an application connection was initiated, the identity of the application, and/or other application characteristics, such as <flow_start_time, flow_end_time, app_type, source_ip, source_port, dest_ip, dest_port, num_packets, packet_loss, . . . >.

The data obtained by network and application monitor 302 is referred to herein as 'uncontrolled features,' as they represent the actual (current) state of the network. This information can be stored by network and application monitor 302 for use by the other components of architecture 300, such as network state modeler 306, described below.

Another component of architecture 300 may be what-if input analyzer 304, which is responsible for analyzing the parameters of the what-if scenario under assessment. In some embodiments, what-if input analyzer 304 may receive the what-if input parameters from a user interface that is part of a network assurance service. For example, a network administrator or other user may specify the what-if scenario that they wish to explore, before making a configuration change to the network. In further embodiments, what-if analyzer 304 may receive the what-if input parameters from a failure prediction model, as part of a predictive routing mechanism. For example, such parameters may relate to rerouting traffic from a first tunnel that is predicted to fail to a second tunnel in the network. In such a case, the what-if scenario may seek to answer the question "if traffic X is rerouted onto tunnel Y, will tunnel Y satisfy the SLA of traffic X?"

During execution, what-if input analyzer 304 may use the input from the user interface or other upstream process to map this to input events of interest. In one embodiment, the system may enable the user to specify the different applications that would be started from a given source-node to any destination node at a given time period. In a second embodiment, the system can automatically specify the amount of traffic that will be redirected on one tunnel or path from another that is about to go down. In any case, the input to what-if input analyzer 304 may take the form of an array of tuples, each being referred to as an "event." For example, the input to what-if input analyzer 304 may be of the following form: [(start_time, end_time, app_type, source_node, dest_node, expected_SLA, expected_num_bytes, expected_duration_of_flow), . . . ], which specifies the list of applications (specified by app_type) started between time periods (start_time, end_time) between a given set of nodes (source_node, dest_node). Based on this list of events and integrating information from application monitor 314, what-if input analyzer 304 constructs what are referred to herein as 'controlled' features that are then passed to network state predictor 308.

Another component of architecture 300 is network state modeler 306 which is configured to ingest both the network and application states from network state monitor 312 and application monitor 314, respectively. More specifically, in various embodiments, network state modeler 306 may include a model trainer 316 configured to use this information to learn a network state model 318 that models the complex relationships between these two streams of information. In other words, model trainer 316 trains network state model 318 to infer what happens to the network state (e.g., traffic, loss, etc.) when different types of applications start sending traffic in the network.

Figure 4:
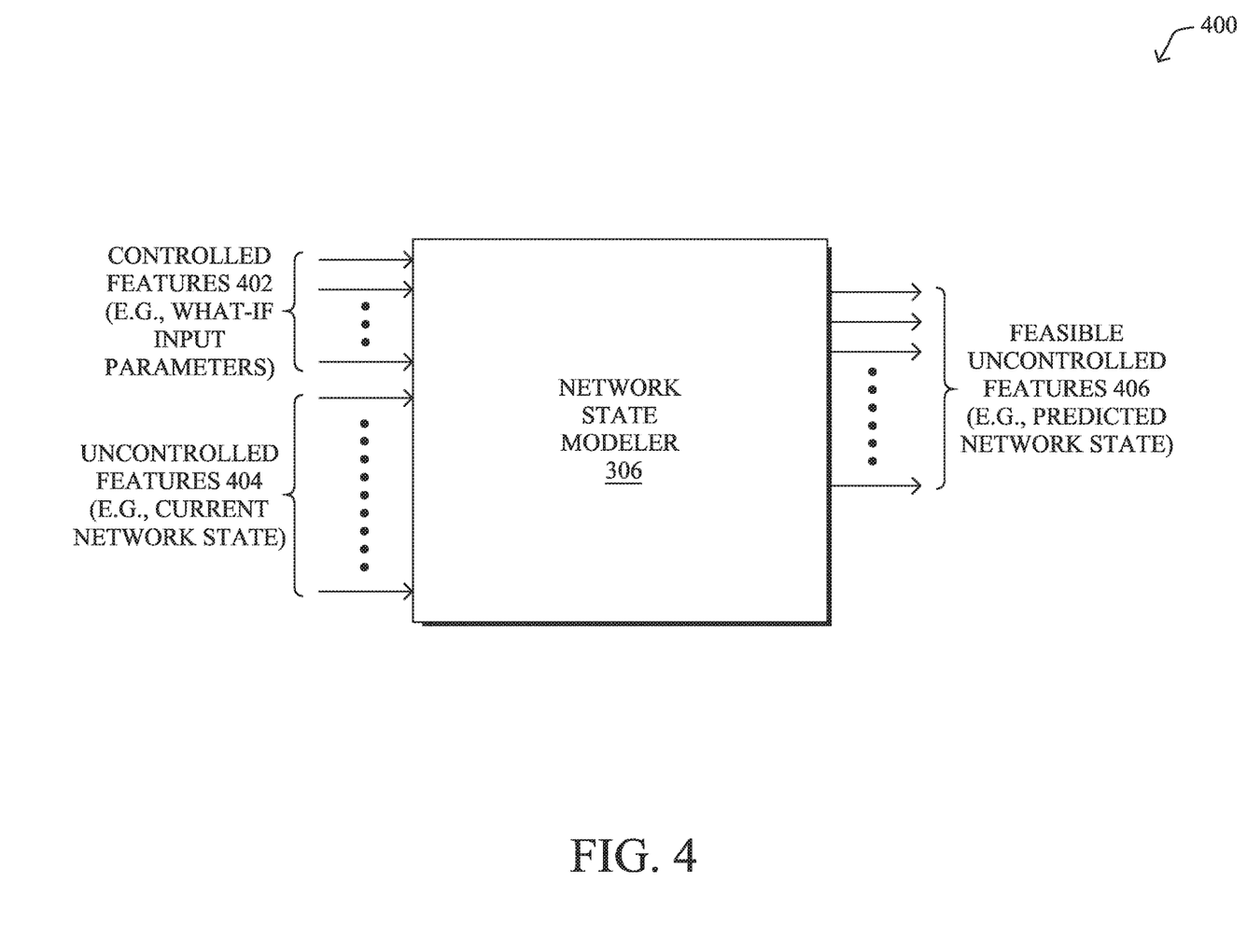
FIG. 4 illustrates an example of a network state modeler.

For purposes of illustration, FIG. 4 shows network state modeler 306 in greater detail, according to various embodiments. As shown, the information that network state modeler 306 deals with can be divided into the following categories:

Controlled Features 402: These are the input features for network state modeler 306 that are independent and can be controlled by the system, for purposes of what-if scenario assessment. Such what-if input parameters can be extracted by what-if input analyzer 304, which constructs the set of controlled features 402 for consumption by network state modeler 306. For example, if the user of the user interface asks the question: "would the SLA be violated, if 100 more voice calls are added," the '100 voice calls' can be extracted and used as input to network state modeler 306.

Uncontrolled Features 404: These are the features that are hard to control by the system, such as the state data indicative of the current network state. Notably, the network may experience different performance metrics (e.g., loss, latency, jitter, throughput, failures, etc.), which are usually a function of very complex interactions between different elements of a network. While they are hard to estimate, these features are measurable and, hence, can also be used as input to network state modeler 306. For example, uncontrolled features 404 may be obtained by network and application monitor 302 for input to network state modeler 306.

Feasible Uncontrolled Features 406: The outputs of network state modeler 306 are the predicted/re-estimated values for uncontrolled features 404 conditioned on controlled features 402.

According to various embodiments, network state modeler 306 is responsible for training a model (e.g., network state model 318 in FIG. 3), to infer the feasible uncontrolled features 406, given the controlled features 402 and the original uncontrolled features 404.

Referring again to FIG. 3, model trainer 316 of network state modeler 306 is responsible for training network state model 318 to infer the above feasible uncontrolled features. In some embodiments, network state model 318 may take the form of an event-response model. In this context, the idea is to use a regression model to predict the output network state, basically modeling the response of the network for a given network state and a triggering event. More precisely, network state model 318 may take the form of a multivariate regression model, such as a multi-layer perceptron model, gradient boosted regression tree, or the like, trained by model trainer 316 to regress the values of the feasible uncontrolled features, given the controlled and uncontrolled features.

The training of the regression model by model trainer 316 requires the creation of an appropriate dataset, where explicit information is collected about the behavior of the uncontrolled features, in response to precise changes in the controlled features. The data for training such a model is available since network and application monitor 302 may be constantly storing the data for consumption by network state modeler 306.

In another embodiment, model trainer 316 may leverage network stress testing, to obtain the training data for network state model 318. In such cases, live/real traffic flows, or synthetically generated flows, may be redirected onto a path or tunnel, to identify boundary conditions that can greatly improve the accuracy of network state model 318. For example, the volume of traffic may be increased on a tunnel under scrutiny, until the tunnel no longer satisfies an SLA.

An important, yet challenging aspect of model trainer 316 is that the feasible uncontrolled features typically need be modeled as a probability distribution conditioned on new values of controlled features, as their relationship may not be fully deterministic.

In a second embodiment, model trainer 316 may instead train network state model 318 to model the complex relationships between the controlled and uncontrolled features through use of a generate adversarial model (GAN). More specifically, model trainer 316 may train a conditional GAN.

Traditionally, as would be appreciated by one skilled in the art of machine learning, GANs consist of two paired neural networks competing against each other. The first network of a GAN, called the generator, learns to generate realistic samples starting from some randomly sampled vector (e.g. a vector in which each component is randomly sampled from a normal distribution of variance 1 and average 0, or some other distribution). The second network in a GAN, called the discriminator, is trained to discriminate between real samples and those artificially generated by the generator. Those two networks are competing as the generator is optimized to fool the discriminator, while the discriminator is optimized to discern the synthetic examples generated by the generator from the real samples.

Conditional GANs are a slightly modified version of GANs where an additional signal is added to steer the generation of the examples. The conditional signal can be anything providing extra information about the sample to be generated. For example, in the case of computer vision, the conditioning signal is often the label of the class of images we aim to generate. This additional information is provided both to the generator, in order to steer the generation process, and to the discriminator, to provide more information about the samples that it is meant to discern.

In the specific case shown, model trainer 316 may train network state model 318 as a conditional GAN, where the conditioning signal is the concatenation of the controlled and uncontrolled features and the signal generated by the generator and scrutinized by the discriminator comprises the feasible uncontrolled features. The so obtained generator encodes the distribution of the feasible uncontrolled features conditioned over both the controlled and uncontrolled features, opening up the possibility of generating multiple samples for any given set of values for the controlled features. This can be particularly useful to provide soft-answers to the what-if questions, with a distribution of possible values and confidence intervals, rather than one hard answer. Another advantage of generative models is that they do not require to collect a dedicated dataset as in the case of the regression models.

The proposed GAN-based approach for training network state model 318 is more suitable in use cases where the input samples cover only a few subspaces (e.g., are populated in only a few regions of input vector space). In such a scenario, a discriminative model can only predict accurately, if the input lies in such a subspace (e.g., requiring the collection of explicit and prices information, as explained above). Conversely, the regression-based model approach will be inaccurate in other regions since it is not trained well in other spaces. However, a generative model abstracts the space into a generated distribution. Thus, usually, it is better in extrapolating input where there are not enough samples (e.g., if the learned distribution is accurate). An event-response model might generally outperform the generative approach in cases where the variabilities in the feature space are bounded and well understood, so to allow for the collection of high quality datasets. Eventually, generative models can be chosen over event-response models in cases where a soft-answer are required. Finally, regardless of the exact approach taken for training, model 318 can be passed to network state predictor 308 for use.

Another component of architecture 300 is network state predictor 308 that is responsible for using network state model 318 to infer the feasible uncontrolled features, given the controlled and uncontrolled features from network and application monitor 302 and what-if input analyzer 304. For example, network state predictor 308 may predict the network state in terms of traffic, loss, latency, resource consumption, etc., given the current state of the network and under the scenario whereby certain application traffic is rerouted in the network from one tunnel to another.

Finally, architecture 300 may include any number of network KPI models 310 that take the predictions from network state predictor 308 as input and output KPI value predictions. For example, as shown, network KPI models 310 may include an application SLA prediction model 310*a* that uses the predicted network state values (e.g., the feasible uncontrolled features) from predictor 308, to make an SLA prediction 320. Similarly, network KPI models 310 may also include a tunnel failure prediction model 310*b* configured to make a tunnel failure prediction 322, based on the predicted network state values from network state predictor 308. Tunnel failure prediction 322 may, for example, indicate that the what-if scenario would lead to a certain tunnel in the network failing.

Figure 5:
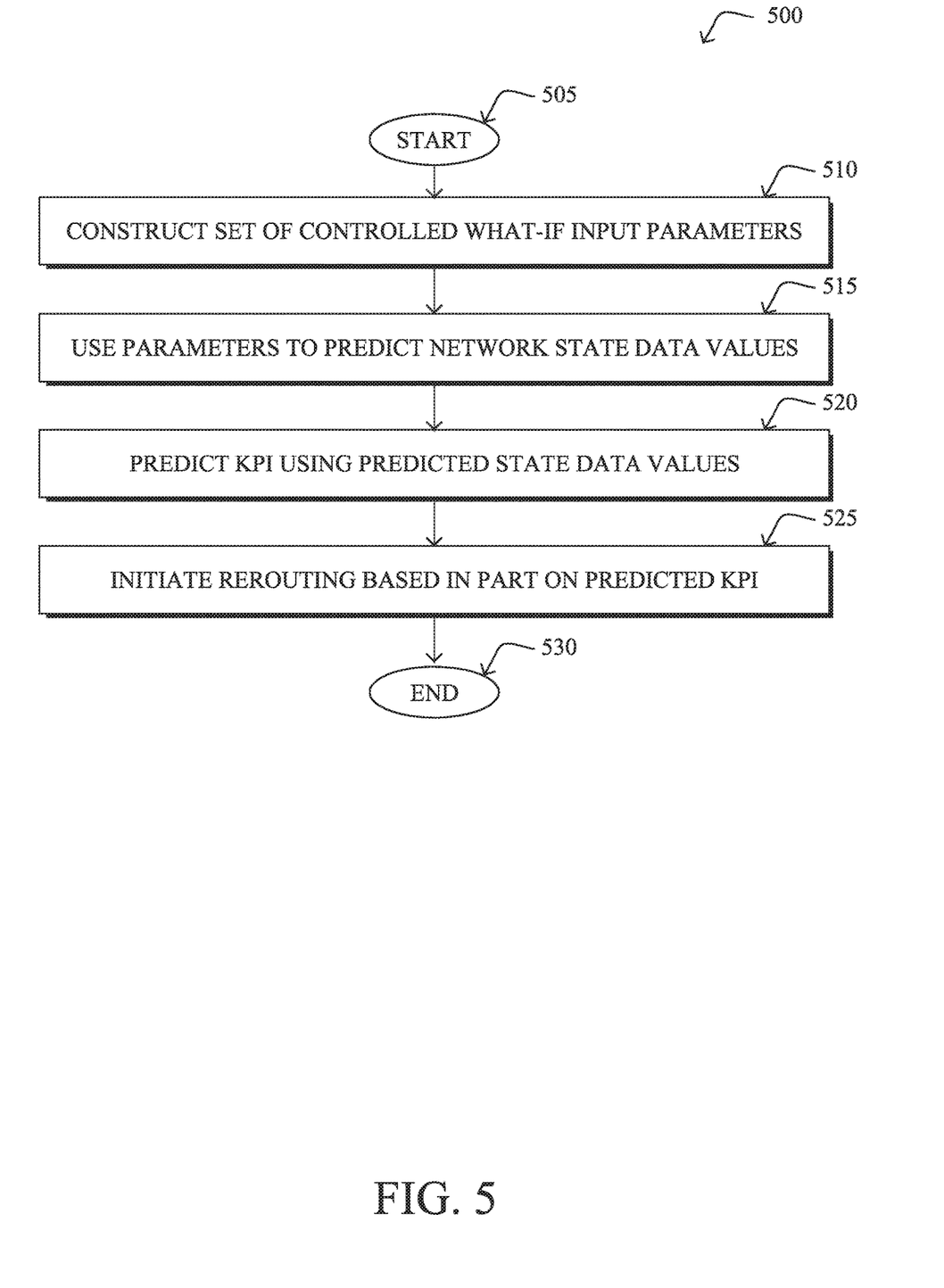
FIG. 5 illustrates an example simplified procedure for what-if modeling in a network.

FIG. 5 illustrates an example simplified procedure for what-if modeling in a network, in accordance with one or more embodiments described herein. For example, a non-generic, specifically configured device (e.g., device 200) may perform procedure 500 by executing stored instructions (e.g., process 248). The procedure 500 my start at step 505 and continue on to step 510 where, as described in greater detail above, the device may construct a set of controlled what-if input parameters for evaluating a what-if scenario in a network. As noted above, such parameters may represent network features that can be controlled directly, such as the assignment of certain application traffic to a specific tunnel or path, the client count for a wireless access point, etc. In general, the device may extract these parameters from the what-if scenario under consideration.

At step 515, as detailed above, the device may use the set of controlled what-if input parameters and state data indicative of a current state of the network as input to a network state model. In general, the state data may be indicative of the current state of the network in terms of loss, latency, traffic patterns, resource usage in the network, combinations thereof, or the like. In turn, the network state model predicts values for the state data conditioned on the what-if input parameters. In one embodiment, the network state model may comprise a regression model trained to predict values for the state data conditioned on the what-if input parameters. In another embodiment, the model may comprise a conditional GAN that concatenates the set of controlled what-if input parameters and the state data into a conditioning signal, to predict the values for the state data conditioned on the what-if input parameters.

At step 520, the device may predict a KPI in the network by using the predicted values for the state data from the network state model as input to a machine learning-based KPI prediction model, as described in greater detail above.

For example, the device may predict that, under the what-if scenario, a particular tunnel in the network will fail, an SLA will or will not be met, etc.

At step 525, as detailed above, the device may initiate a routing change in the network based in part on the predicted KPI. For example, in the case of predictive routing, the device may predict a failure of a first tunnel in the network. Thus, the corresponding what-if input parameters may relate to rerouting traffic from the first tunnel to a second tunnel in the network, thereby allowing the device to explore this what-if scenario. In turn, if the predicted KPI indicates that rerouting the traffic onto the second tunnel will still satisfy the SLA of the traffic and/or not have any other negative effects, the device may reroute the traffic in advance of the predicted failure of the first tunnel. In further embodiments, such as when the device is part of a network assurance system, the device may initiate the routing change in part by providing the predicted KPI to a user interface, thereby allowing the network administrator to first review the effects of the what-if scenario before rerouting the traffic. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for what-if modeling in a network to be broken down into two phases: predicting the network state under the what-if scenario and then predicting the resulting KPI(s). In contrast to using a single what-if modeling approach, this allows intelligent network controller systems (e.g., Cisco DNA, vManage, etc.) to leverage multiple models to predict the health of the network. For example, there may be a tunnel failure model and an SLA predictor model that predicts two different KPIs for the network. By introducing a core 'network state predictor,' which predicts the network state in a hypothetical/what-if state, the system enables reusing all predictive KPI models for prescriptive (what-if) use cases. This can be achieved by simply changing the input of KPI models from the current network state to the predicted network state.

A further advantage of the techniques herein provides for interpretability of the what-if scenario. Oftentimes, the user is not just interested in monitoring a few KPIs of the network under the hypothetical what-if scenario but is also interested in interpreting what happens to the network when such a hypothetical state occurs. The what-if input, the current state of the network, and the output of the network state prediction model can thus be used to interpret and analyze the expected, when such a scenario occurs.

While there have been shown and described illustrative embodiments that provide for coupling reactive and predictive routing, it is to be understood that various other adaptations and modifications may be made within the spirit and scope of the embodiments herein. For example, while certain embodiments are described herein with respect to using certain models for purposes of predicting failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
constructing, by a device, a set of controlled what-if input parameters for evaluating a what-if scenario in a network, wherein the set of controlled what-if input parameters relate to features of the network that are independently controlled;
using, by the device, the set of controlled what-if input parameters and state data indicative of a current state of the network as input to a network state model comprising a conditional generative adversarial network that implements a conditioning signal, wherein the conditioning signal a) steers a prediction of values for the state data conditioned on the what-if input parameters and b) is a concatenation of the set of controlled what-if input parameters and the state data;
predicting, by the device, a key performance indicator (KPI) in the network by using predicted values for the state data from the network state model comprising the conditional generative adversarial network as input to a machine learning-based KPI prediction model; and
initiating, by the device, a routing change in the network based in part on the predicted KPI.

2. The method as in claim 1, further comprising:
predicting a failure of a first tunnel in the network, wherein the controlled what-if input parameters relate to rerouting traffic from the first tunnel to a second tunnel in the network.

3. The method as in claim 2, wherein initiating the routing change in the network based in part on the predicted KPI comprises:
determining that the predicted KPI will satisfy a service level agreement associated with the traffic; and
proactively rerouting the traffic from the first tunnel onto the second tunnel, in advance of the predicted failure of the first tunnel.

4. The method as in claim 1, wherein the network state model comprises a regression model trained to predict values for the state data conditioned on the what-if input parameters.

5. The method as in claim 1, wherein the state data is indicative of one or more of: loss, latency, or resource usage in the network.

6. The method as in claim 1, wherein the set of controlled what-if input parameters are indicative of a traffic for a set of one or more applications being sent between a source and destination in the network over a period of time.

7. The method as in claim 1, wherein initiating the routing change in the network based in part on the predicted KPI comprises:
providing the predicted KPI to a user interface.

8. The method as in claim 1, wherein the network is a software-defined wide area network (SD-WAN).

9. An apparatus, comprising:
one or more network interfaces to communicate with a network;
a processor coupled to the network interfaces and configured to execute one or more processes; and
a memory configured to store a process executable by the processor, the process when executed configured to:
 construct a set of controlled what-if input parameters for evaluating a what-if scenario in a network, wherein the set of controlled what-if input parameters relate to features of the network that are independently controlled;
 use the set of controlled what-if input parameters and state data indicative of a current state of the network as input to a network state model comprising a conditional generative adversarial network that implements a conditioning signal, wherein the conditioning signal a) steers a prediction of values for the state data conditioned on the what-if input parameters and b) is a concatenation of the set of controlled what-if input parameters and the state data;
 predict a key performance indicator (KPI) in the network by using the predicted values for the state data from the network state model comprising the conditional generative adversarial network as input to a machine learning-based KPI prediction model; and
 initiate a routing change in the network based in part on the predicted KPI.

10. The apparatus as in claim 9, wherein the process when executed is further configured to:
 predict a failure of a first tunnel in the network, wherein the controlled what-if input parameters relate to rerouting traffic from the first tunnel to a second tunnel in the network.

11. The apparatus as in claim 10, wherein the apparatus initiates the routing change in the network based in part on the predicted KPI by:
 determining that the predicted KPI will satisfy a service level agreement associated with the traffic; and
 proactively rerouting the traffic from the first tunnel onto the second tunnel, in advance of the predicted failure of the first tunnel.

12. The apparatus as in claim 9, wherein the network state model comprises a regression model trained to re-estimate the state data conditioned on the what-if input parameters.

13. The apparatus as in claim 9, wherein the state data is indicative of one or more of: loss, latency, or resource usage in the network.

14. The apparatus as in claim 9, wherein the set of controlled what-if input parameters are indicative of a traffic for a set of one or more applications being sent between a source and destination in the network over a period of time.

15. The apparatus as in claim 9, wherein the apparatus initiates the routing change in the network based in part on the predicted KPI by:
 providing the predicted KPI to a user interface.

16. The apparatus as in claim 9, wherein the network is a software-defined wide area network (SD-WAN).

17. A tangible, non-transitory, computer-readable medium storing program instructions that cause a device to execute a process comprising:
 constructing, by the device, a set of controlled what-if input parameters for evaluating a what-if scenario in a network, wherein the set of controlled what-if input parameters relate to features of the network that are independently controlled;
 using, by the device, the set of controlled what-if input parameters and state data indicative of a current state of the network as input to a network state model comprising a conditional generative adversarial network that implements a conditioning signal, wherein the conditioning signal a) steers a prediction of values for the state data conditioned on the what-if input parameters and b) is a concatenation of the set of controlled what-if input parameters and the state data;
 predicting, by the device, a key performance indicator (KPI) in the network by using the predicted values for the state data from the network state model comprising the conditional generative adversarial network as input to a machine learning-based KPI prediction model; and
 initiating, by the device, a routing change in the network based in part on the predicted KPI.

18. The computer-readable medium as in claim 17, wherein the process further comprises:
 predicting a failure of a first tunnel in the network, wherein the controlled what-if input parameters relate to rerouting traffic from the first tunnel to a second tunnel in the network.

* * * * *

UNITED STATES PATENT AND TRADEMARK OFFICE
CERTIFICATE OF CORRECTION

PATENT NO. : 11,146,463 B2
APPLICATION NO. : 16/431782
DATED : October 12, 2021
INVENTOR(S) : David Tedaldi Page 1 of 1

It is certified that error appears in the above-identified patent and that said Letters Patent is hereby corrected as shown below:

In the Specification

Column 1, Line 28, amend as shown:
ing from the lower network layers or using a keep - alive Column 6, Line 65, amend as shown:
sum of true positives and false negatives, which quantifies Column 7, Line 48, amend as shown:
sional feature vector $X = [X_1, X_2, ...X_N]$, where $X_i$ denotes Column 7, Line 56, amend as shown:
feature vector X wherein feature $X_i = 2 * X_i$ and perform an Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*